United States Statutory Invention Registration [19]

[11] Reg. Number: H246

Banura

[43] Published: Apr. 7, 1987

[54] MOTOR DRIVE CIRCUIT

[75] Inventor: George A. Banura, Ridgecrest, Calif.

[73] Assignee: The United States of America as represented by the Secretary of the Navy, Washington, D.C.

[21] Appl. No.: 788,619

[22] Filed: Jun. 17, 1985

[51] Int. Cl.[4] ..... H02P 1/04; G05B 1/06

[52] U.S. Cl. ..... 318/480; 318/640; 318/484

*Primary Examiner*—Stephen C. Buczinski
*Assistant Examiner*—Linda J. Wallace
*Attorney, Agent, or Firm*—Robert F. Beers; W. Thom Skeer

[57] ABSTRACT

A power-up circuit for an electric motor uses an electronic start-up circuit which increases the applied power in a predetermined fashion. An electronic timer is used to switch the motor circuit from start to run conditions after a desired time interval. Photo-electric coupling devices isolate the control circuitry from transient signals after accompanying motor operation.

8 Claims, 15 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

Fig. 4
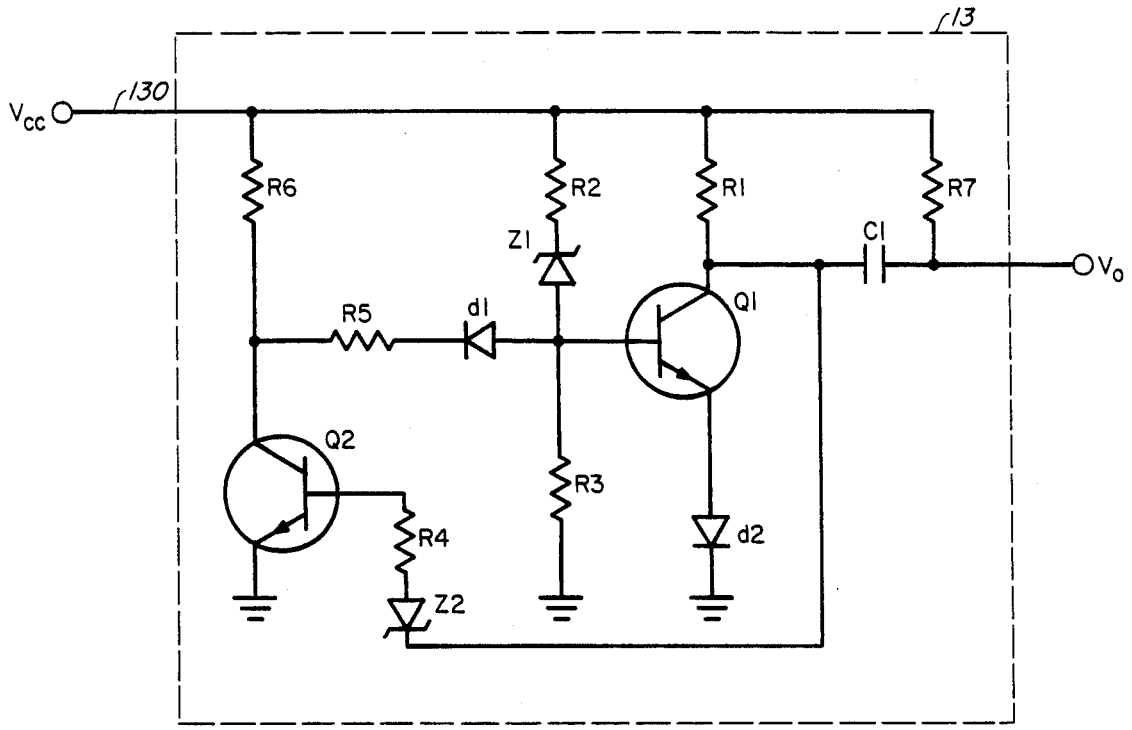
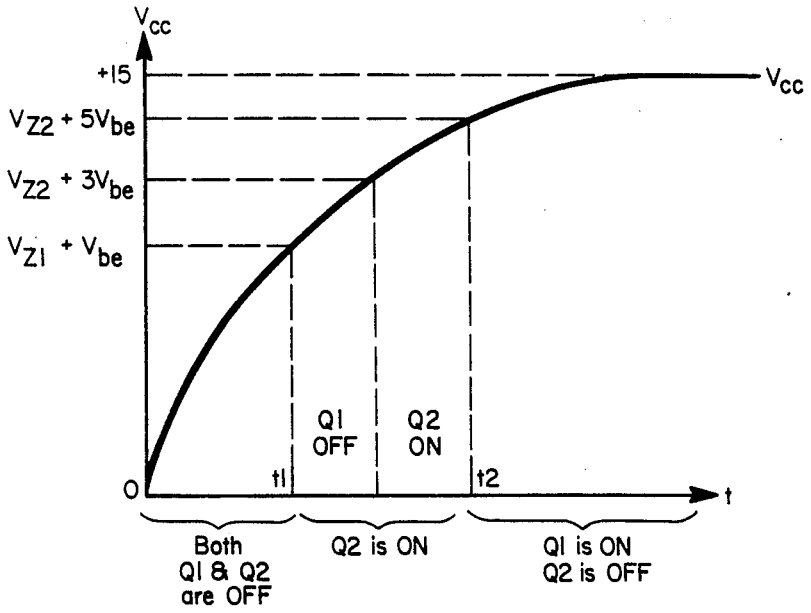
Fig. 5

MOTOR DRIVE CIRCUIT

BACKGROUND OF THE INVENTION

1. Field of the Invention

This invention relates to the field of electronics. More particularly the invention is directed to electric power supply. By way of further characterization, the invention relates to the supply of AC power to a load by application of a DC control voltage. More specifically, the invention relates to the application of start and run power to an electric motor. By way of specific illustration, but without limitation thereto, the invention will be described as it pertains to the starting of an electric motor in an avionics environment.

2. Description of the Prior Art

A wide variety of motor power feed circuitry are known in the motor control arts. Although each is more or less satisfactory for its intended application, a need in the aerospace arts for a motor control having particular characteristics has been a persistent, and largely unsolved, problem.

One such characteristic is the provision of the necessary start and run voltages. During starting, a high current must be applied to the secondary windings in addition to the primary windings. After start, the voltage to the secondary winding must be reduced.

Another problem area addressed by the invention is the provision of a high degree of isolation between the motor power supply and the DC control current sources. In avionic and space applications the control power is shared by many other circuits and electrical artifacts must not be allowed into the common power source.

Another shortcoming of the known circuitry is the inability to use standard parts to permit hybridization for specific applications. Thus, it is desirable to use standard circuit semiconductor chips rather than the special circuitry as is often required by the prior art devices.

The prior art devices, in general, can operate only over a narrow temperature range. It is considered highly desirable to operate over the temperature range of −55° C. to 100° C. for avionic applications.

It is desirable to have load switching to be electronically controlled. High vibration and G-loadings make governor type switching systems unreliable in these arduous working environs.

SUMMARY OF THE INVENTION

The invention uses an SCR device to provide the necessary AC power switching. A photo-electric coupler assures isolation. A conventional electronic timer replaces governor type switches. A low-power start-up circuit controls the SCRs and starts the timer by the intentional generation of a single pulse at power-up. A voltage regulator provides a uniform source of supply voltage.

OBJECTS OF THE INVENTION

With the foregoing discussion of the prior art in mind, it is an object of this invention to provide an avionics motor control circuit.

Another object of the invention is to provide a motor control to provide timed start-up without mechanical switches.

A still further object of the invention is to provide a motor control with improved isolation between motor and control circuitry.

Yet another object of the invention is to provide a light, low-power consuming motor control circuit using standard microcircuit chips.

These and other objects will become more clear in reference to the accompanying description, claims and drawing in which like parts have like numbers and in which:

BRIEF DESCRIPTION OF THE DRAWINGS

FIG. 4 is a schematic of the start-up circuit of FIG. 1;

FIG. 5 is a waveform of the rise time of the DC control voltage;

DESCRIPTION OF THE PREFERRED EMBODIMENT

Figure 1:
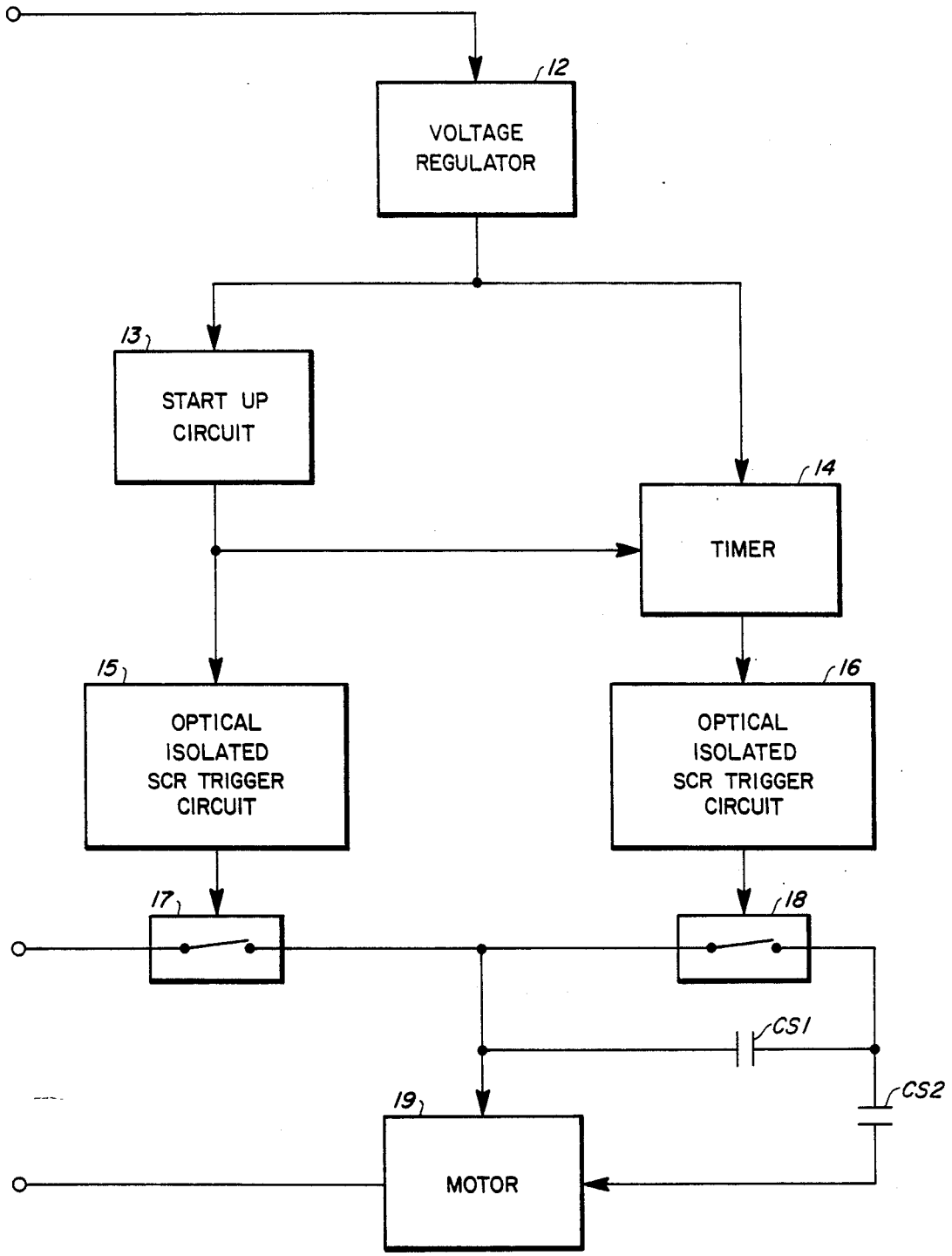
FIG. 1 is a block diagram of the invention.

FIG. 1 illustrates a block diagram showing the major components of the invention. A voltage regulator 12 supplies a fixed DC voltage to a start-up circuit 13 and timer 14. Start-up circuit 13 applies the voltage from voltage regulator 12 to an optical isolated SCR trigger 15 and generates a trigger to initiate the action of timer 14. Upon initiation, timer 14 produces a pulse of a predetermined duration. This time signal is fed to optically isolated SCR trigger circuit 16. The output of optical isolated SCR trigger circuits 15 and 16 are coupled to switches 17 and 18 respectively. Although illustrated as single-pole, single-throw switches for purposes of simplicity, switches 17 and 18 are SCR switches to control the application of power to a motor illustrated as a load at 19. When start-up circuit 13 reaches the operational threshold, switch 17 applies power to the primary winding of motor 19.

The operation of switch 18 provides a short circuit of capacitor CSl which is in series with a second capacitor and the secondary winding of motor 19. When switch 18 is open the two capacitors, illustrated as CS1 and CS2, are connected in series thereby reducing the current flowing to the secondary winding of motor 19. When switch 18 is closed capacitor CSI is shorted out and motor 19 receives more current for starting purposes. The function of the individual circuit components will be more fully explained in reference to the other following figures.

Figure 2:
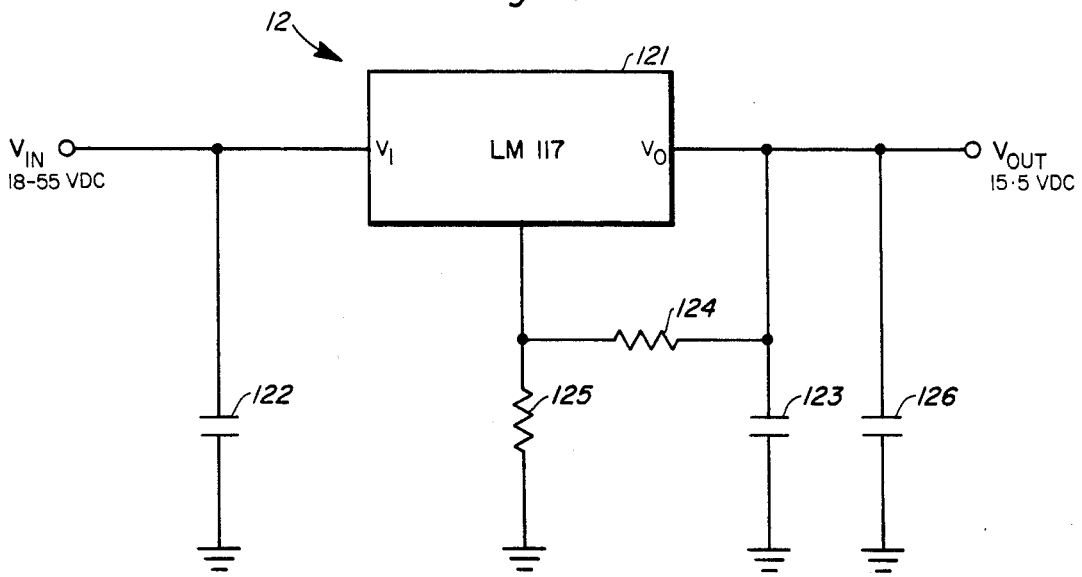
FIG. 2 is a schematic of the voltage regulator of FIG. 1.

Referring to FIG. 2, the constructional details of the voltage regulator 12 are shown. A standard chip 121 which may, for example, be an LM117 performs a voltage regulation in the well understood fashion. Resistors 124 and 125 provide the necessary gain feedback to determine the output voltage. Switches 121 and 123 bypass high frequency noise pulses to stabilize the operation of circuit 121. A capacitor 126 is of a large value and, in the conventional fashion, serves as a voltage stabilizing capacitance. In operation, voltages having variations between 18 and 55 volts are reduced to a 15½ volt DC output for other circuit purposes.

Figure 3:
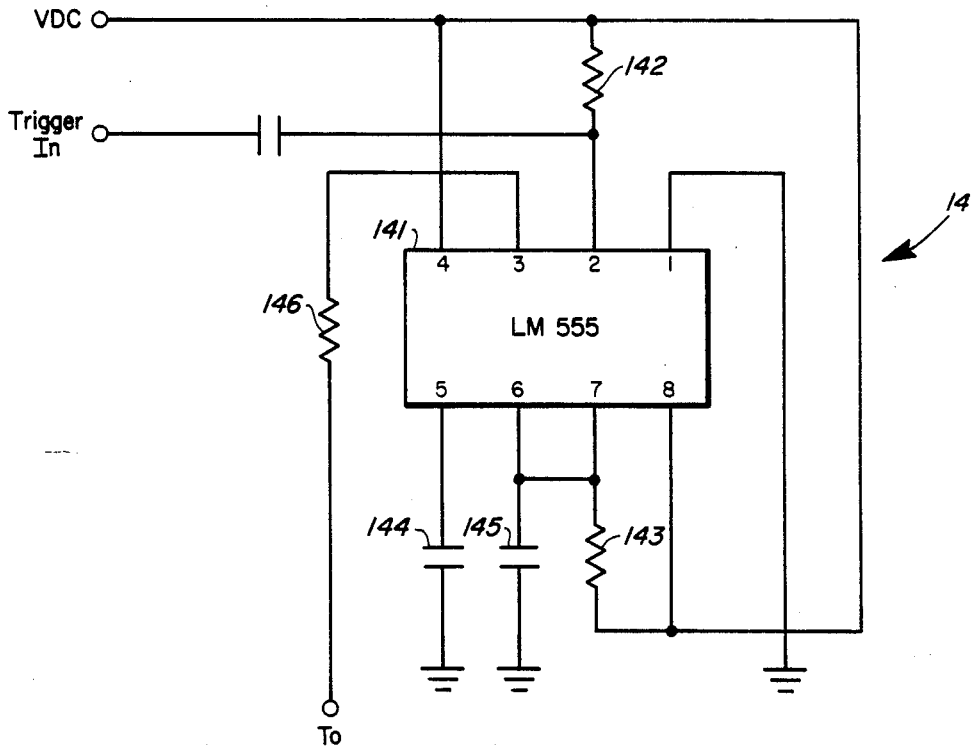
FIG. 3 is a schematic of the timer of FIG. 1.

FIG. 3 shows the constructional details of timing circuit 14. A conventional timer 141 is fed DC power through a resistor 142. The duration of the timing pulse is determined by the RC time constant of resistor 143 and capacitor 145. The LM555 was chosen for circuit 141 because of its high current drive output capability and simplicity of operation. The output is fed to the light emitting portion of optical isolated SCR trigger through a resistor 146. The value of resistor 146 is determined by the current capabilities of the driven photoelectric device. For a 40N40 design 820 ohms provides the necessary 16 milliamps of current and 690 ohms for the MOC3021 provides the 20 milliamp current required by that device. This circuitry, as stated in the objects of the invention, provides the desired utilization of standard chips over the operational temperature ranges. Of course, other similar, state-of-the-art circuits could be used if desired.

FIG. 4 illustrates the constructional details of start-up circuit 13. A power bus 130 enters from the left of the figure connecting the output of voltage regulator 12 to the circuit. A first transistor Q1 is connected in a self-biasing arrangement to shunt this power supply. Q1 has a current limiting resistor R1 in the collector. Resistors R2 and R3 together with a Zener diode Z1 complete the biasing circuit for the base of transistor Q1 and a diode d2 in the emitter circuit connects the transistor to ground. A second transistor Q2 with a grounded emitter is connected to the collector of transistor Q1 through series connected resistor R4 and Zener diode Z2. The collector of transistor Q2 is connected to the base of transistor Q1 through a series resistor R5 and a diode dl. A resistor R6 connected between the collector of transistor Q2 and the DC voltage bus 130 completes the circuit. A capacitor C1 couples the output of transistor Q1 to timer 14.

Referring to FIG. 5, a graphic representation of the rise of the input voltage VCC and the operation of the two transistors Q1 and Q2 is illustrated. When the power is below a predetermined value, both transistors Q1 and Q2 are off or not conducting. As the voltage increases, transistor Q2 commences conducting and continues to do so until turned off. Prior to transistor Q2 being turned off, transistor Q1 commences conduction. Shortly thereafter transistor Q2 is turned off and transistor Q1 remains on. The consequence of this sequential action of the transistors and the biasing arrangement provided by the illustrated circuitry will be described in connection with the waveforms of FIGS. 6A through 6C and FIGS. 7A through 7C.

Figure 6A:
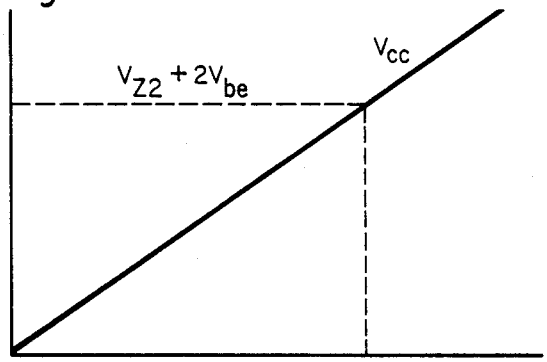
FIGS. 6A, 6B, and 6C are figures showing waveforms at selected voltage points for the circuit without transition Q1 in the circuit of FIG. 4.
Figure 6B:
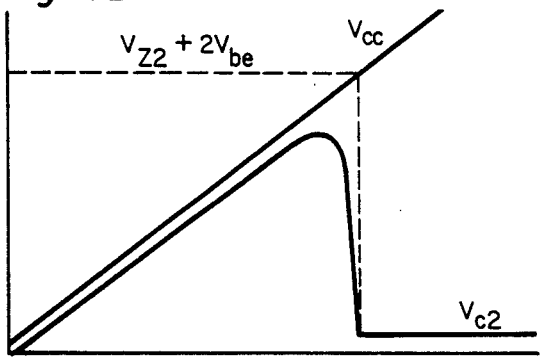
Figure 6C:
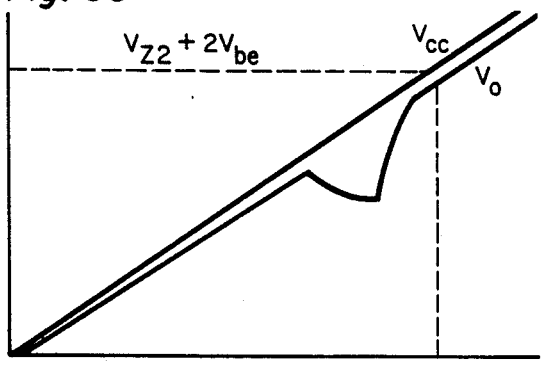

Referring to FIGS. 6A, 6B, and 6C together with the circuit of FIG. 4 the operation of that circuit will be described. The notation used in the description of the circuit will refer to the elements of the respective transistors Q1 and Q2 thus $V_{C2}$ would be the voltage at collector 2. Other voltages are labeled in the figure where necessary. As previously described when power is first applied to the voltage regulator 12 the supply voltage VCC rises slowly. This slow rise is due to the time constants of the circuit and the size of the filter capacitor 126, previously discussed. FIG. 6A indicates the ideal voltage rise which would be a slow linear ramp, as is well understood. In actuality, the curve is somewhat more exponential as indicated in FIG. 5. The description will be facilitated if one can imagine that transistor Q2 is removed from the circuit as by breaking the collector or emitter connection. Thus configured, the circuit of FIG. 4 would be a relatively conventional voltage switching arrangement.

In this configuration transistor Q1 will turn on when its base voltage equals approximately twice the voltage between the base and emitter. However, due to the slow rise time of VCC Q1 will turn on rather slowly resulting in an output voltage $V_O$ which follows the applied voltage VCC the resulting waveform shown in FIG. 6B shows the collector voltage to drop at the turn on time. The regulation bias supplied by R2, R3, and Z1 causes Q1 to correct for this down going collector voltage such that the output as shown in FIG. 6C to recover and continue to track the voltage VCC.

A slight variation due to commencement or conduction is insufficient to provide a trigger for associated circuitry. In order for voltage $V_O$ to trigger the timer, FIG. 2, the output $V_O$ must go down to zero as a sharp spike. The failure of the output voltage $V_O$ to produce this spike would result in failure to trigger the timer 14.

Figure 7A:
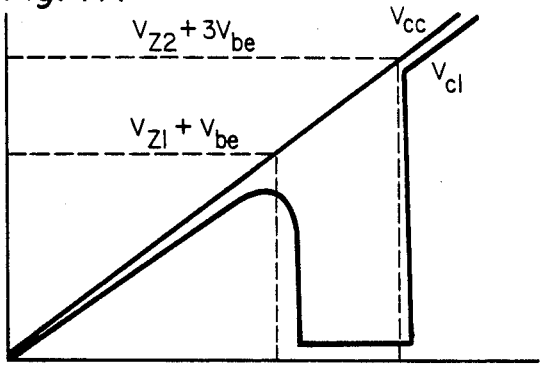
FIGS. 7A, 7B, and 7C are figures showing waveforms at selected voltage points in the operation of the circuit of FIG. 4.
Figure 7B:
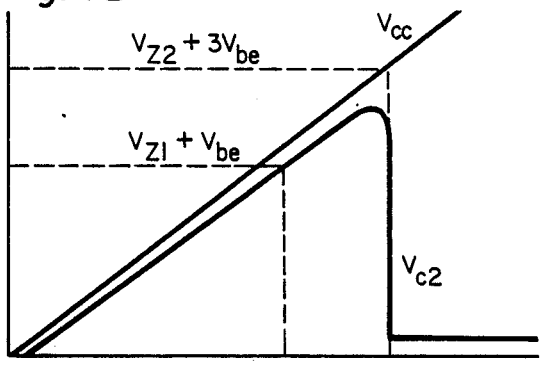
Figure 7C:
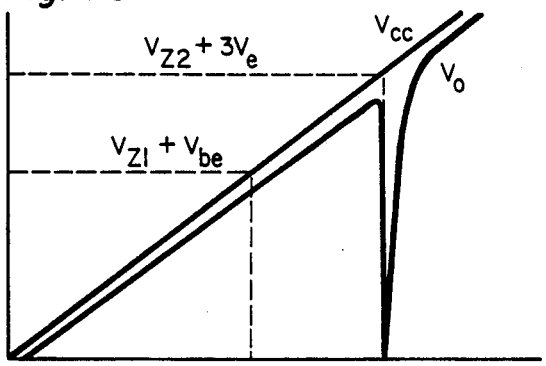

Now, assuming that Q2 is connected in the circuit as illustrated Q1 will turn on when VCC equals the Z1 voltage, that is the voltage drop across Zener diode 1 plus the voltage between the base and emitter of Q1. Note that the turn on time of Q2 is rather long due to the slow rise of VCC. With Q2 turned on Q1 will be prevented from turning on until the voltage at the base of Q1 rises to a value near twice the base to emitter voltage. As the voltage to the base of Q1 approaches twice the base emitter voltage, Q1 will begin to turn on reducing voltage at the collector 1 below VZ1 plus VBE. This results in the immediate cutoff of Q2 and the immediate turn on of Q1. The output $V_0$ will then be a sharp pulse that extends to zero as shown in FIG. 7C. This sharp turn off and turn back on of Q1 is shown by the collector waveform voltage 7A and the collector waveform of Q2 shown at 7B. The resulting spike shown at FIG. 7C will be sufficient to trigger the 555 timing circuit in timer 12.

Thus it is seen that the purpose of Q2 is to speed up the turn on time of Q1 so that a sharp pulse that extends to zero can be obtained in the output voltage. Note that Q2 will turn on when the supply voltage VCC is much greater or equal to VZ2 plus the base emitter voltage. Q1 will turn on when VCC is much greater than VZ1 plus three times the base emitter voltage. Thus, to ensure that Q2 will turn on first, the condition that VZ1 plus three VBE is greater than VZ2 plus VBE must be satisfied. Setting VZ1 and VZ2 equal to approximately 10 volts will satisfy the above condition. The turn on conditions may be explained as follows, to turn Q1 on VBZ must be equal to 2VBE. Thus, the drop across the resistor R4 must be equal to the base to emitter voltage. Therefore, in order to have the base voltage of Q1 equal to twice the base to emitter voltage, VCC must be equal to VZ1, a voltage across Zener diode Z1, and three times the base to emitter voltage. In actual operations with the applied voltage transistor Q2 will turn on when its base voltage equals approximately 0.7 volt. Transistor Q1 will turn on when its base to emitter voltage equals approximately twice the voltage of the base to emitter on Q1. The value of Z1 and Z2 are chosen such that the voltage across Zener diode Z2 is much greater than the voltage across Zener Z1 therefore guaranteeing that transistor Q2 will always turn on first. When Q2 turns off, diode dl will be off, or not conducting, and a large current pulse will be applied to the base of Q1 resulting in a fast turn on of Q1. This fast turn on resulting in a trigger, a negative going pulse, sufficient to trigger the timing circuit in timer 14. These transit responses are illustrated in FIGS. 7A, 7B, and 7C.

Figure 8:
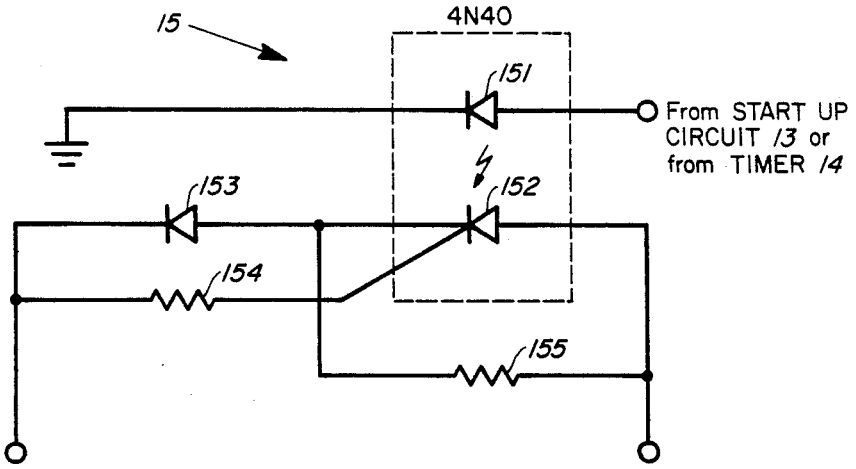
FIG. 8 is a circuit diagram of the optical isolated SCR trigger circuit of FIG. 1.
Figure 9:
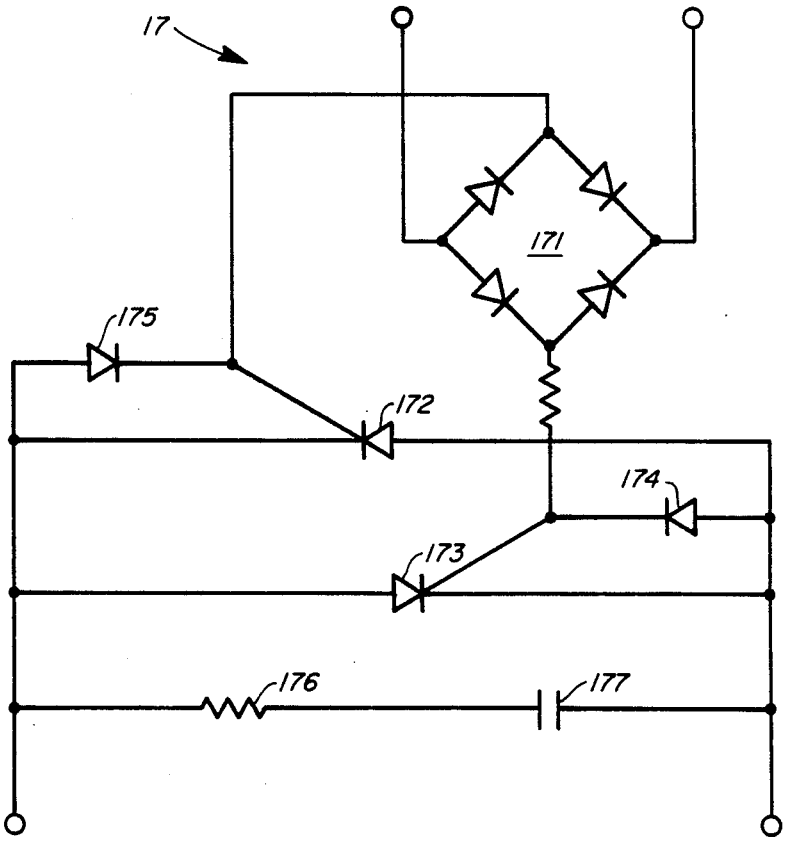
FIG. 9 is a schematic of one variation of the SCR switch of FIG. 1 to be used with the optical isolated SCR trigger circuit of FIG. 8.

Referring to FIG. 8, the details of the optical isolated SCR trigger 15 is illustrated. It should be noted, that optical isolated SCR trigger circuit 15 is identical to optical isolated SCR trigger circuit 16 in most applications. Because developmental models of the invention have been implemented with separate circuitry, for purposes of description the SCR trigger circuit 15 and SCR switch 17 will be treated as if they were different from SCR trigger circuit 16 and associated SCR switch 18. For purposes of reducing the difference in number of parts and simplification of service normally the circuits will be identical although, if desired, they may be different as described. The 4N40 opto-coupled SCR is shown as having a light emitting diode 151 and a photodetector 152. Upon application of power from start-up circuit 13, or from timer 14, light emitting diode 151 emits a pulse of light energy to cause diode 152 to commence conduction. Resistor 155 which is connected from the gate to the cathode of the SCR diode 152 serves somewhat as a sensitivity control. The manufacturer of the 4N40 diode suggests that a 57K ohm resistor will cause positive triggering when 12 milliamps is passed through the light emitting diode portion 151. In practice, a one megohm resistor has been utilized. Resistor 154 and diode 153 connect the output of switch 15 to the bridge 171 composed of four 1N4007 diodes. The output of bridge 171 is used to control the current through SCR diodes 172 and 173. The clamping diodes 174 and 175 are used to clamp the reverse bias between the gate and cathode of their associated SCRs. This is done to prevent the SCRs 172 and 173 from destruction which will occur if the gate-to-cathode voltage exceeds −5 volts. A series RC network comprising resistor 176 and capacitor 177 is conventional and provides for elimination of short duration transients.

Figure 10:
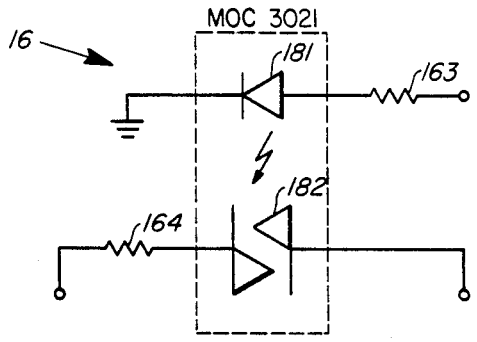
FIG. 10 is a schematic of a second type optical isolated trigger circuit of FIG. 1.
Figure 11:
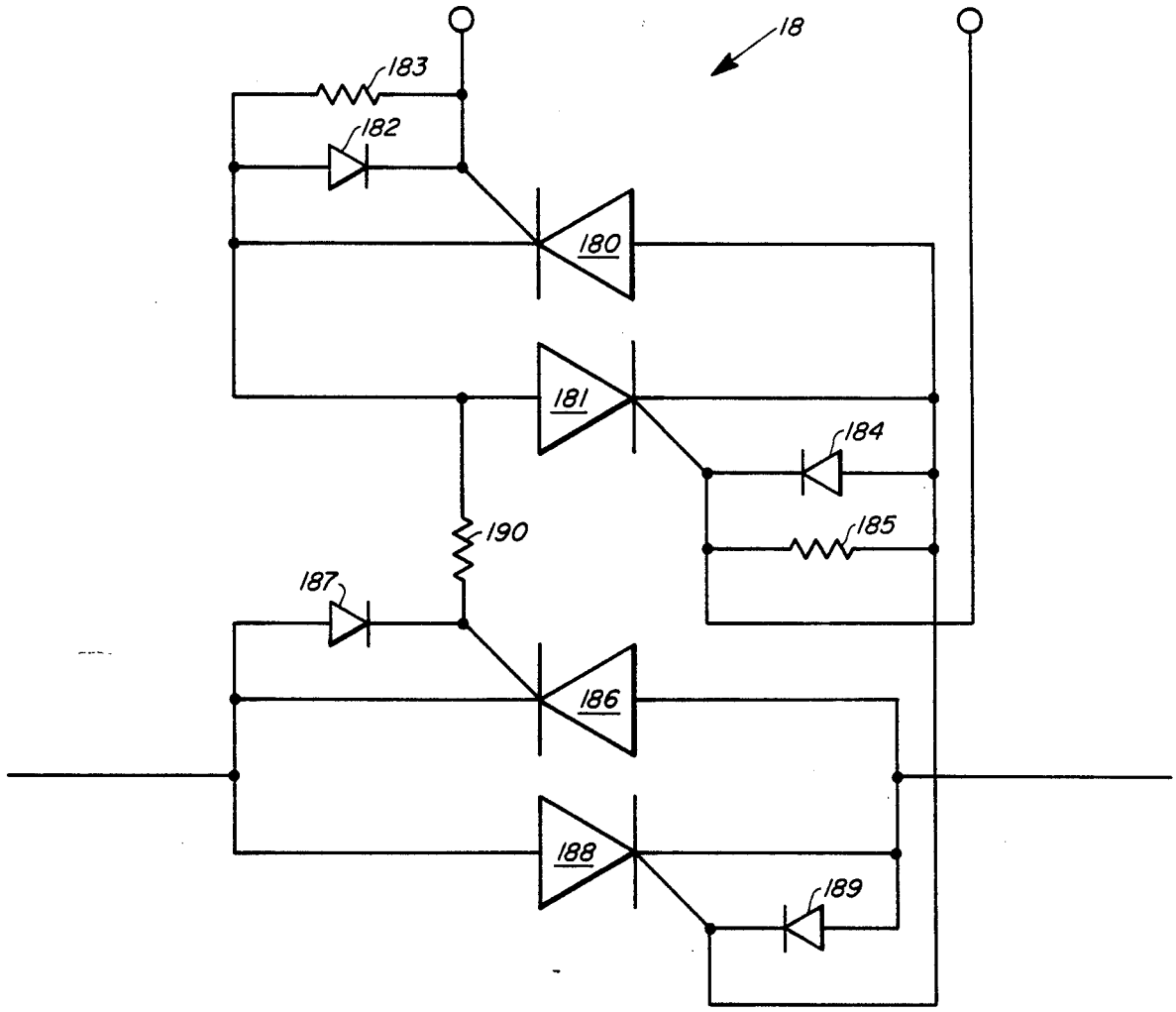
FIG. 11 is a schematic diagram of a SCR switch to be used with the isolated trigger circuit of FIG. 10.

Referring now to FIGS. 10 and 11, the species using the MOC3021 optical isolator will be described. As previously noted, this arrangement will be described as if it pertains to switch 16, although, as previously noted, either switch 15 or 16 may be constructed in this manner. Because the MOC3021 is an optical-coupled triac, it will be observed that no bridge circuit is necessary. That is, the light emitting diode portion 181 of MOC3021 which receives electrical current via a current limiting resistor 163 causes conduction through the output section 182 of the triac in either direction and this current is limited by the internal construction of the device and current limiting resistor 164.

The output from FIG. 10 is connected to the SCR arrangement illustrated at FIG. 11. Because the MOC3021 is incapable of supporting the necessary gate drive current for the main SCRs 186 and 187, which may be, for example, 2N1777A units, it was necessary to introduce intermediate SCRs. These SCRs are illustrated at 180 and 181 and may be of the type 2N2329 for example. As is conventional in SCR practice, the cathode-to-gate coupling between SCRs 180 and 181 is accomplished by conventional diodes and resistors indicated at 182, 183, 184, and 185, similarly, as 187 and 189 serve similar functions in the main SCR rectifiers 186 and 188. Resistor 190 is a coupling resistor and, in developmental models, was of a 300 ohm value.

The foregoing description taken together with the appended claims constitute a disclosure such as to enable a person skilled in the electronics and motor design arts having the benefit of the teachings contained therein to make and use the invention. Further, the structure herein described meets the objects of the invention, and generally constitutes a meritorious advance in the art unobvious to such an artisan not having the benefit of these teachings.

What is claimed is:

1. A power-up circuit comprising:

an electric load having an electrical supply;

a first switch means connected in series with said electric supply;

at least one impedance determining component externally connected to said load;

a second switch means connected to said impedance determining component for selectively disconnecting the impedance determining component to alter the impedance of the load;

a timer circuit effectively connected to said second switch means to cause operation thereof in response to a trigger pulse applied thereto; and a start-up circuit effectively connected to said first switch means to cause operation thereof in response to a DC voltage applied thereto and connected to said timer circuit to apply a trigger pulse thereto.

2. A power-up circuit according to claim 1 wherein said timer circuit is connected to said second switch means by a photo coupling device.

3. A power-up circuit according to claim 1 wherein said start-up circuit is connected to said first switch means by a photo coupling device.

4. A power-up circuit according to claim 1 wherein said first and second switch means each comprise at least one silicon-controlled rectifier.

5. A power-up circuit according to claim 1 wherein said start-up circuit includes:

an input source of DC power connected to the output via a resistor;

a first transistor connected in a self-biased arrangement across the input source of DC power;

a first Zener diode in the gate-collector bias circuit of said first transistor;

a second transistor having the gate effectively connected to the collector of said first transistor and the collector connected to said input source of DC power and effectively connected to the base of said first transistor; and a second Zener in the collector-to-gate circuit of said first-to-second transistor connection, whereby, at a predetermined point in the rise of the applied DC power, a negative going pulse is produced in the output corresponding to the turn off of said second transistor.

6. A power-up circuit according to claim 5 wherein the effective connection between the collector of the second transistor and the base of said first transistor includes a first diode.

7. A power-up circuit according to claim 5 wherein the emitter of said first transistor is connected to the ground via a second diode.

8. A start-up power circuit for applying DC power in a predetermined fashion to an electrical load and producing a sharp timing pulse at a predetermined time in the power application cycle comprising:

a DC power bus;

a first transistor connected in circuit to shunt said power bus said first transistor circuit having, a first resistor connected between the collector of said first transistor and the power bus, a first Zener diode connected to the base of said first transistor, a second resistor connecting said Zener diode to said power bus, a third resistor connecting the base of said first transistor and said First Zener diode to a ground, a first diode connected to the base of said first transistor, a second diode connected between the emitter of said first transistor and ground, and a first capacitor connected to the collector of said first transistor;

a second transistor connected in circuit to shunt said power bus said second transistor circuit having, an emitter connected to ground, a fourth resistor connected to the base of said second transistor, a second Zener diode connected between said fourth resistor and the collector of said first transistor;

a fifth resistor connected between the collector of said second resistor and said first diode connected to the base of said first transistor, and a sixth resistor connected between the collector of said second transistor and said DC power bus; and a seventh resistor connected between said DC power bus and said first capacitor to provide an output point for said start-up circuit.

* * * * *